J. T. MAULDIN.
GARDEN PLOW.
APPLICATION FILED JULY 21, 1919.

1,323,082.

Patented Nov. 25, 1919.
2 SHEETS—SHEET 1.

Inventor
J. T. Mauldin.

Witness

J. T. MAULDIN.
GARDEN PLOW.
APPLICATION FILED JULY 21, 1919.

1,323,082.

Patented Nov. 25, 1919.
2 SHEETS—SHEET 2.

Inventor
J. T. Mauldin.

Witness

By C. A. Snow & Co.
Attorneys

UNITED STATES PATENT OFFICE.

JOSEPH T. MAULDIN, OF SHAWNEE, OKLAHOMA.

GARDEN-PLOW.

1,323,082.  Specification of Letters Patent.  Patented Nov. 25, 1919.

Application filed July 21, 1919.  Serial No. 312,198.

*To all whom it may concern:*

Be it known that I, JOSEPH T. MAULDIN, a citizen of the United States, residing at Shawnee, in the county of Pottawatomie and State of Oklahoma, have invented a new and useful Garden-Plow, of which the following is a specification.

This invention relates to new and useful improvements in agricultural implements, and more particularly to garden, or hand plow attachments.

The principal object of the invention is to increase the power of the operator, by applying an attachment to the plow for engagement with the body of the operator, during the plowing operation, thereby adding the force of the body to aid the operator in thrusting the plow forward, through the soil.

A further object of the invention is to provide a device of this kind which will be adjustable to accommodate itself to operators of various heights.

A further object of this invention is to provide a device of this kind which will have engagement with the body of the operator at the groin, or extreme lower portion of the body.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

Referring to the drawings:—

Figure 1:
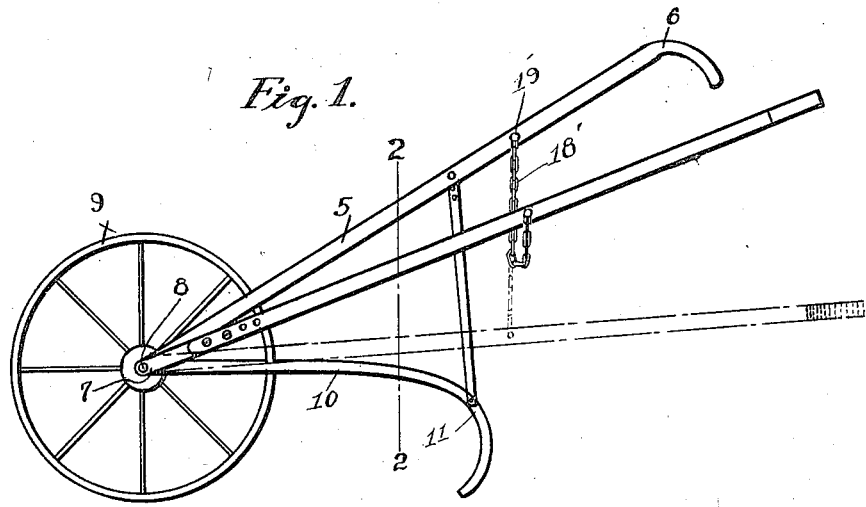
Figure 1 illustrates a side elevational view of a hand plow having my attachment secured thereto.
Figure 2:
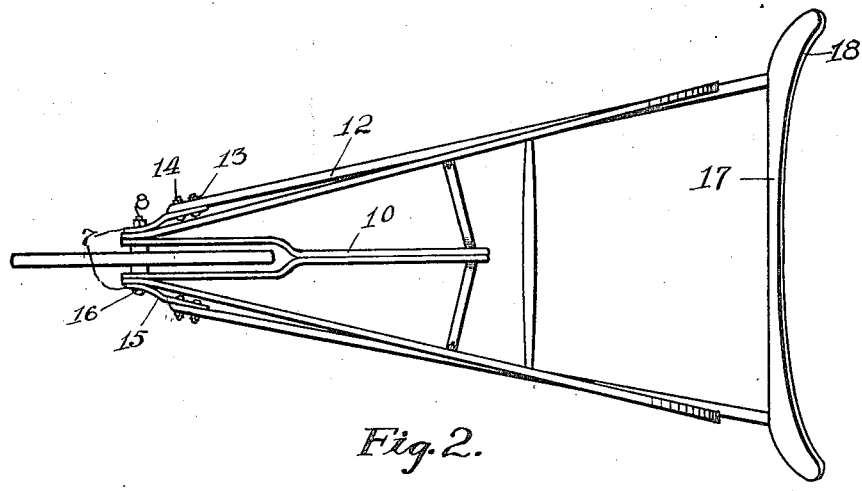
Fig. 2 is a top plan view of the same.
Figure 4:
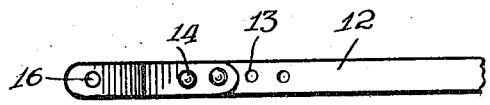
Fig. 4 is a side elevational view of one of the parallel rods forming a part of the present invention.
Figure 3:
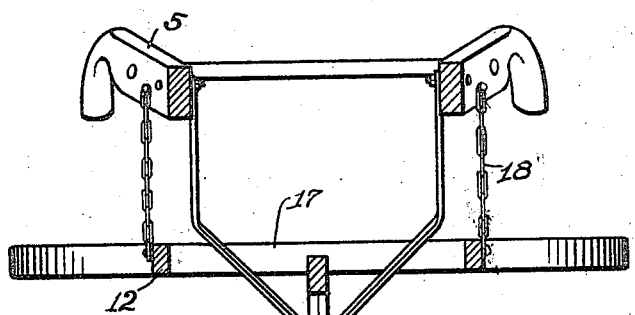
Fig. 3 is a vertical sectional view taken on line 2—2 of Fig. 1.
Figure 5:
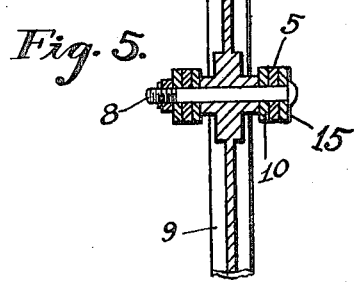
Fig. 5 is a vertical sectional view through the wheel of the plow.

Referring now to the drawings in detail, the numeral 5 designates the operating bars which have their upper or outer ends curved as at 6, to provide suitable handles.

The forward or lower ends of the operating bars 5 are apertured as at 7 to receive the shaft 8 on which the wheel 9 operates, the wheel 9 being for the purpose of supporting the forward ends of the plow.

Plow beams 10 are secured together, throughout a portion of their lengths, and are curved downwardly as at 11 to provide a support to which the usual plow point, not shown, is secured. The forward ends of the plow beams 10 are spaced apart to provide a clearance for the wheel 9 operating therebetween, the extreme forward ends of the beams being also apertured to receive the shaft 8 of the wheel 9.

The attachment which comprises the subject matter of my invention, includes parallel rods 12 provided with suitable apertures 13 to receive the bolts 14, which bolts secure the metal bars 15 to the parallel rods 12, the forward ends of said metal rods 15 being apertured as at 16 to permit the same to be supported on said shaft 8.

From the foregoing it will be seen that the connection between the rods 12 and rods 15, permits the pusher element to be adjusted with relation to the wheel 9 of the plow, to meet various requirements of the operator.

As shown the parallel rods 12 converge toward the forward ends, and are spaced apart at their outer ends, to support the body engaging member 17, adjacent the outer ends thereof. The body engaging member is substantially long, being curved adjacent the outer ends thereof, as at 18 to fit the body of the operator.

In order that the attachment will be supported in proper relation with the operating rods 5, I have provided flexible connecting members 18', which have their upper ends secured to the operating rods as at 19 and their lower ends secured to the respective parallel rods 12. It will therefore be seen that an operator may position the body engaging portion, to his body whereby the same will be held by frictional contact therewith, due to the force exerted during the plowing operation.

Having thus described my invention, what is claimed is:—

1. In combination with a hand plow having a shaft and a wheel supported thereon, bars including handles supported by said shaft, parallel rods having their forward ends connected to the shaft, a body engaging member secured to the outer ends of said parallel rods, and flexible means for connecting the bars to the parallel rods for permitting adjustment of the rods with relation to the bars.

2. In combination with a hand plow having a shaft and a wheel supported thereon, bars including handles having connection with the shaft, relatively short metallic rods, having connection with the shaft, parallel rods having openings formed adjacent one end thereof, means extending through one of said openings and engaging the metallic rods for adjustably securing the bars to the rods, means for connecting the rods to the bars and a body engaging member connecting the outer ends of the rods.

In testimony that I claim the foregoing as my own, I have hereto affixed my signature in the presence of two witnesses.

JOSEPH T. MAULDIN.

Witnesses:
   J. P. STRINGFIELD,
   ROLLIE C. FULLEN.